(12) United States Patent
Kato

(10) Patent No.: US 7,293,342 B2
(45) Date of Patent: Nov. 13, 2007

(54) METHOD OF MANUFACTURING STATOR FOR ELECTRIC MOTOR

(75) Inventor: Mitsuru Kato, Anjo (JP)

(73) Assignee: Denso Corporation, Kariya (JP)

( * ) Notice: Subject to any disclaimer, the term of this patent is extended or adjusted under 35 U.S.C. 154(b) by 200 days.

(21) Appl. No.: 11/151,226

(22) Filed: Jun. 14, 2005

(65) Prior Publication Data

US 2005/0229381 A1  Oct. 20, 2005

Related U.S. Application Data

(62) Division of application No. 10/368,402, filed on Feb. 20, 2003, now Pat. No. 6,930,425.

(30) Foreign Application Priority Data

Feb. 28, 2002  (JP) ............................ 2002-053114

(51) Int. Cl.
*H02K 5/00* (2006.01)
*H02K 17/00* (2006.01)

(52) U.S. Cl. ............................ 29/596; 29/605; 29/732; 310/201

(58) Field of Classification Search .......... 29/596–598, 29/732–735; 219/137 R, 85.14, 125.11; 310/201, 234–235

See application file for complete search history.

(56) References Cited

U.S. PATENT DOCUMENTS

| | | |
|---|---|---|
| 1,780,456 A | 11/1930 | Apple |
| 1,843,589 A | 2/1932 | Apple |
| 2,400,902 A | 5/1946 | Allen |
| 2,437,990 A | 3/1948 | Askey |
| 4,806,807 A | 2/1989 | Levino |
| 4,912,831 A | 4/1990 | Levino |
| 5,745,977 A * | 5/1998 | Ichikawa et al. ............. 29/598 |
| 5,955,810 A * | 9/1999 | Umeda et al. ............. 310/208 |
| 6,124,660 A | 9/2000 | Umeda et al. |
| 6,147,432 A | 11/2000 | Kusase et al. |
| 6,181,044 B1 | 1/2001 | Umeda et al. |
| 6,249,956 B1 * | 6/2001 | Maeda et al. ................. 29/596 |
| 6,339,871 B1 * | 1/2002 | Maesoba et al. ............. 29/596 |
| 6,388,358 B1 | 5/2002 | Umeda et al. |
| 6,403,921 B1 * | 6/2002 | Maeda et al. .......... 219/125.11 |
| 6,490,779 B1 | 12/2002 | Tokizawa et al. |
| 6,519,993 B2 | 2/2003 | Even |
| 6,698,083 B2 | 3/2004 | Tokizawa et al. |
| 6,700,282 B2 * | 3/2004 | Mori et al. ................. 310/208 |
| 6,930,425 B2 * | 8/2005 | Kato .......................... 310/201 |
| 7,210,215 B2 * | 5/2007 | Kato et al. .................... 29/596 |

(Continued)

FOREIGN PATENT DOCUMENTS

EP  1041696  10/2000

(Continued)

*Primary Examiner*—Minh Trinh
(74) *Attorney, Agent, or Firm*—Oliff & Berridge, PLC

(57) ABSTRACT

A method of manufacturing a rotary electric machine stator includes inserting straight portions of conductor segments into a plurality of slots of a stator core. The conductor segments are then bent so that connection ends of the conductor segments that are disposed adjacent to each other in a radial direction can incline in opposite circumferential directions to cross one another. Pairs of the connection ends crossing each other are then welded.

8 Claims, 8 Drawing Sheets

U.S. PATENT DOCUMENTS

| | | |
|---|---|---|
| 7,225,526 B2 * | 6/2007 | Tokizawa .................... 29/596 |
| 2001/0007169 A1 | 7/2001 | Takahashi et al. |
| 2002/0046779 A1 | 4/2002 | Even |
| 2002/0053126 A1 | 5/2002 | Maeda et al. |

FOREIGN PATENT DOCUMENTS

| | | |
|---|---|---|
| FR | 2808939 | 11/2001 |
| JP | A 59-209045 | 11/1984 |
| JP | A 60-98843 | 6/1985 |
| JP | A 6-261471 | 9/1994 |
| JP | A-2000-92797 | 3/2000 |
| JP | A 2000-299950 | 10/2000 |
| JP | A 2002-369427 | 12/2002 |

* cited by examiner

METHOD OF MANUFACTURING STATOR FOR ELECTRIC MOTOR

CROSS REFERENCE TO RELATED APPLICATION

This is a Division of 10/368,402, now U.S. Pat. No. 6,930,425, filed Feb. 20, 2003, which claims the benefit of Japanese Patent Application 2002-53114, filed Feb. 28, 2002. The disclosure of the prior applications are hereby incorporated by reference herein in their entirety.

BACKGROUND OF THE INVENTION

1. Field of the Invention

The present invention relates to a stator of a rotary electric machine to be mounted in a vehicle such as a passenger car or a truck and a method of manufacturing such a stator.

2. Description of the Related Art

As the output power of the vehicle generators has been increasing in order to operate various vehicle safety devices. It is well known that the output power of a vehicle ac generator can be increased if the space factor of a stator winding to stator core's slots is increased, which reduces the resistance of the stator winding. The space factor can be increased if the conductors or wires of the stator winding inserted in the slots are snugly fitted to the slots.

For example, Japanese Patents P3196738, P3104700 and Japanese Patent Application Publication P2001-197709, or their corresponding US Patent Application Publication US2002/0053126A1, U.S. Pat. No. 6,403,921B1 and US Patent Application Publication 2001/0007169A1, disclose methods of manufacturing a stator.

FIG. 14 shows one of the methods disclosed in the above-stated publications. As shown in FIG. 14, a plurality of U-shaped conductor segments 404 is inserted into slots of a stator core 400, and the conductor segments 404 are bent to incline in the circumferential direction while connection ends 406 of the conductor segments 404 are clamped. Thereafter, the connection ends 406 are welded together by an arc welder to form a stator winding.

When a stator is manufactured by the above-described method, the connection ends 406 have to have a certain length of axially extending straight portion, which increases useless axial size of the stator.

SUMMARY OF THE INVENTION

The invention is to provide a rotary electric machine stator in which the above axially extending straight portions to be welded are omitted or reduced.

According to a feature of the invention, a pair of connection ends of conductor segments, which are connected together to form a stator winding of a stator, cross each other at an angle larger than zero degree.

Each connection end may have a side surface in contact with a side surface of another connection end to be connected together. However, the connection ends may be connected together at a side surface of one connection end and a top surface of another connection end.

Preferably, one of a pair of conductor segments whose connection ends are welded is disposed adjacent the other conductor segment in a radial direction of the stator and is bent in a circumferential direction of the stator that is opposite to the other conductor segment.

It is another object of the invention is to provide a method of manufacturing a rotary electric machine stator that has the above-stated features. Such a method includes a step of inserting straight portions of conductor segments into a plurality of slots of a stator core, a step of bending the conductor segments so that connection ends of the conductor segments that are disposed adjacent to each other in a radial direction can incline in opposite circumferential directions to cross one another, and a step of welding pairs of the connection ends crossing each other.

Preferably, the step of bending includes a step of attaching a bending tool to a side surface of the conductor segments and a step of turning the bending tool about a position near one of the slots.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A method of manufacturing stator winding of a rotary electric machine stator according to a preferred embodiment of the invention will be described with reference to the appended drawings.

Figure 1:
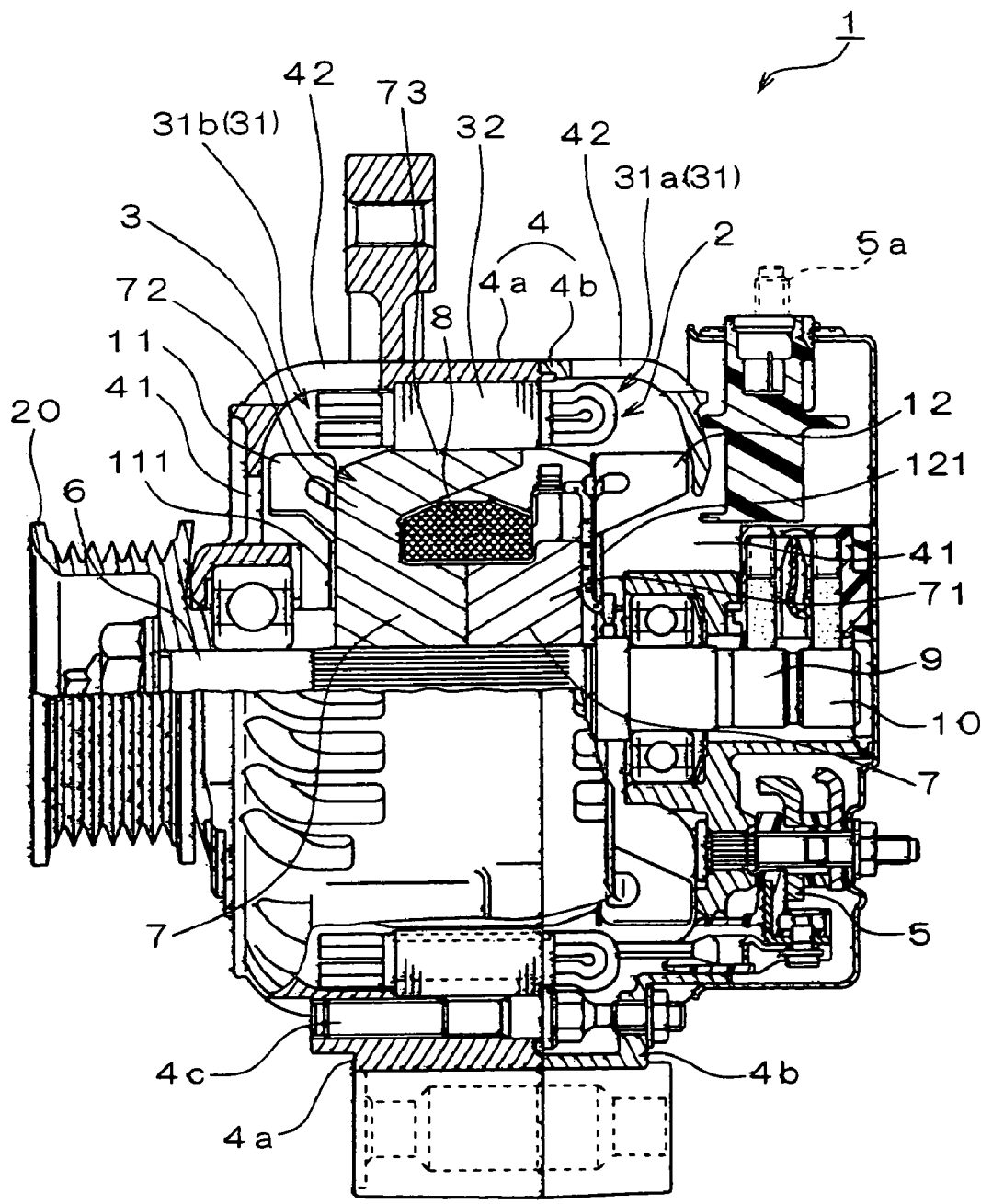
FIG. 1 is a cross-sectional side view of a vehicle ac generator that includes a stator according to a preferred embodiment of the invention.

As shown in FIG. 1, a vehicle ac generator 1 according to the preferred embodiment of the invention includes a stator 2, a rotor 3, a housing 4, a rectifier unit 5 and others.

The rotor 3 functions as a magnetic field generator and rotates together with a shaft 6. The rotor 3 includes a pole core unit 7, a field coil 8, a pair of slip rings 9, 10, a mixed flow fan 11 and a centrifugal fan 12. The shaft 6 carries a pulley 20 that is rotated by an engine via a belt. The pole core unit 7 has twelve claw-shaped magnetic poles 73 and is composed of a pair of pole core members. Each pole core member has a boss portion 71, a disk portion 72 and six claw-shaped magnetic poles 73.

The mixed flow fan 11 is fixed by welding to the end of the rotor 3 near the pulley 20. The mixed flow fan 11 has two kinds of fan blades: inclined fan blades that incline to a fan base plate 111 and upright blades. The centrifugal fan 12 is welded to the other end of the rotor 3. The centrifugal fan 12 has a fan base plate 121 and upright fan blades extending from the fan base plate 121.

The housing 4 is composed of a front housing member 4a and a rear housing member 4b. Each housing member 4a, 4b has air-intake windows 41 disposed at the axial ends and air-discharge windows 42 disposed at radially outer peripheral portions opposite first and second coil-end groups 31a, 31b of the stator 2.

The rectifier unit 5, which converts ac power generated from the stator 2 to dc power, is disposed at a portion of the ac generator away from the pulley 20.

The stator 2 functions as an armature. The stator 2 includes a stator core 32 that has a plurality of slots 35, a three-phase stator winding 31 that is composed of a plurality of U-shaped conductor segments 33 disposed in the slots 35 and insulators 34 that insulate the stator winding 31 from the stator core 32.

Figure 2:
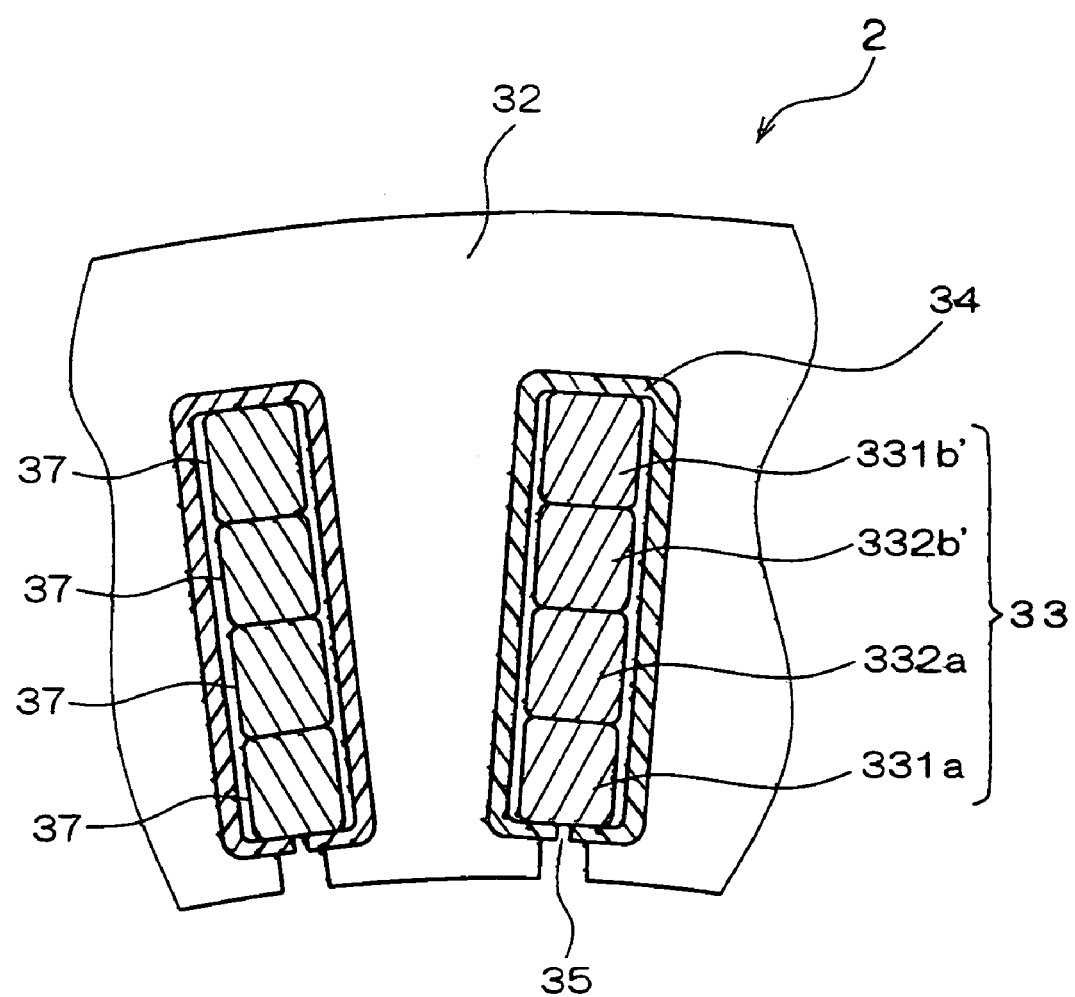
FIG. 2 is a fragmentary cross-sectional view of a portion of the stator having slots in which straight portions of conductor segments are inserted.

Thirty six slots 35 are circumferentially formed at the inner surface of the stator core 32 at equal intervals so as to accommodate the three-phase stator winding 31. As shown in FIG. 2, four or another even number of conductors 331a, 332a, 332b', 332a' are aligned in a radial direction in each slot 35 in four layers: an innermost layer, an inner middle layer, an outer middle layer, and an outermost layer. The conductor segments 33 are coated with insulation film made of polyamideimide.

The U-shaped conductor segments 33 are connected in a prescribed pattern to form the stator winding 31. Each of the U-shaped conductor segments 33 have a pair of conductors that are welded at the second coil-end group.

Figure 3:
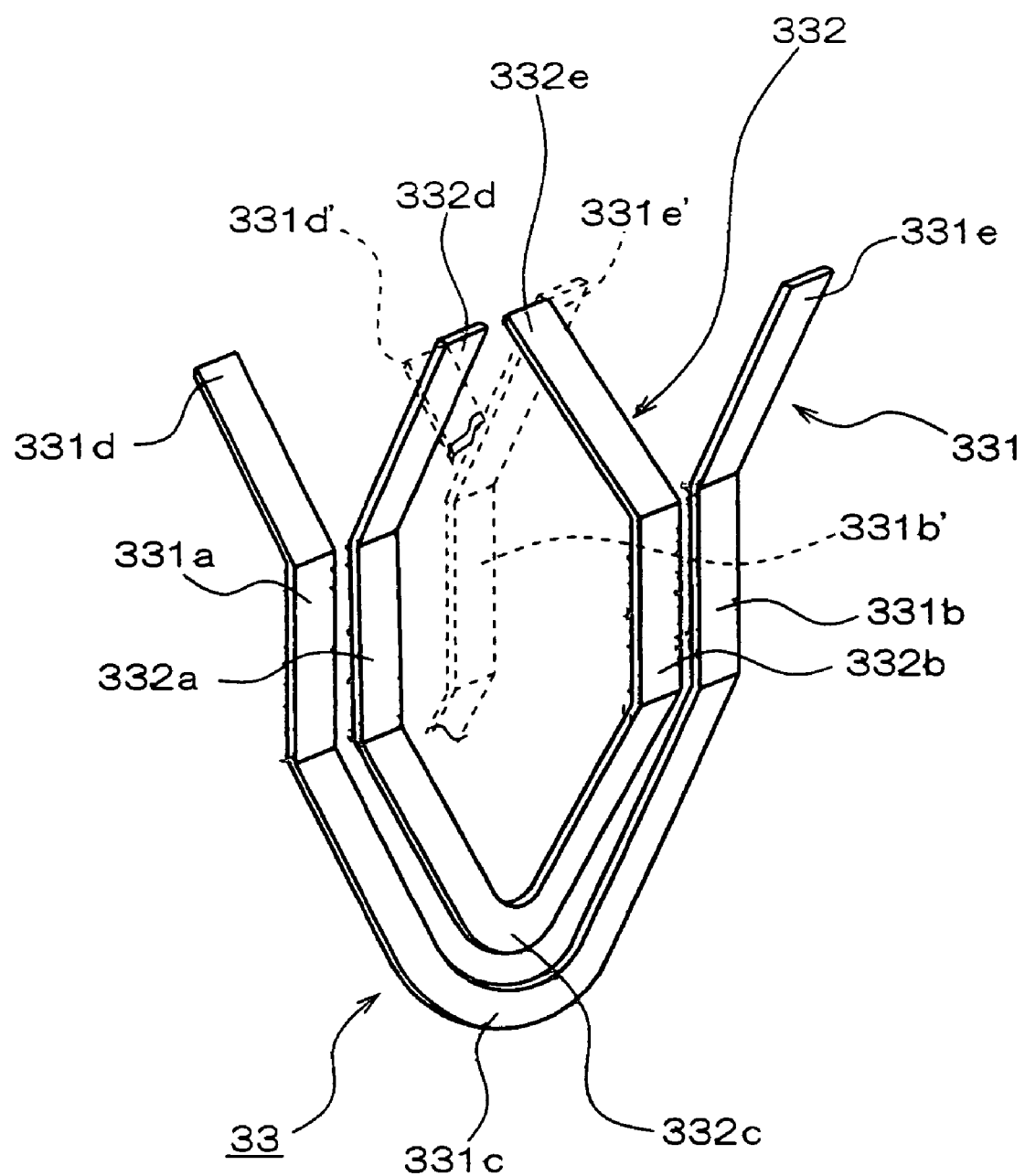
FIG. 3 is a perspective view of a pair of U-shaped conductor segments.

The conductor 331a of one of the U-shaped conductor segment 33 disposed in a first one of the slots 35 is paired with another conductor 331b of the same conductor segment 33 disposed in a second one of the slots 35 that is one pole-pitch spaced apart from the first one of the slots 35. For example, the conductor 331a disposed in the radially innermost layer of a first slot 35 is paired with the conductor 331b disposed in the radially outermost layer of a second slot that is one pole-pitch spaced apart from the slot 35 as shown in FIGS. 2 and 3. In the same manner, the conductor 332a disposed in the radially inner middle layer of the first slot is paired with the conductor 332b disposed in the radially outer middle layer of the second slot 35. Accordingly, a turn portion 331c of the first conductor segment 33 encloses a turn portion 332c of the second conductor segment 33. The turn portion 332c forms a middle-layer coil-end, and the turn portion 331c forms an outer-layer coil-end at an axial end of the stator core 22.

On the other hand, the conductor 332a projecting from the inner middle layer of the first slot 35 is welded to a conductor (which is not shown) projecting from the innermost layer of the second slot 35. In the same manner, a conductor 331b' projecting from the outermost layer of the first slot 35 is connected to the conductor 332b that is projecting from the outer middle layer of the second slot 35.

Accordingly, connection ends 332d, 331d' for connecting the conductors 332a and another respectively disposed in the outer middle and the outermost layers and the connection ends 331e', 332e for connecting the conductors 331b', 332b respectively disposed in the innermost and inner middle layers are shifted from each other in the circumferential direction and disposed at the other axial end of the stator core 32. Thus, inner connection portions that include the connection ends 332d, 331d' and outer connection portions that include the connection ends 331e' and 232e form double coaxial rings of coil-end layers.

As shown in FIG. 3, a larger U-shaped conductor segment 331 is provided with the conductor 331a disposed in the innermost layer and the conductor 331b disposed in the outermost layer, and a smaller U-shaped conductor segments 332 is provided with the conductor 332a disposed in the inner middle layer and the conductor 332b disposed in the outer middle layer. One of the larger U-shaped segments 231 and one of the smaller U-shaped conductor segments form a basic pair of the U-shaped conductor segments 33. The above described arrangement is repeated at all the slots 35 of the stator core 22.

The stator winding 21 is comprised of three phase-windings, each of which is a two-turn coil formed of a plurality of the basic pairs of U-shaped conductor segments 33 to be circumferentially mounted in the stator core 32.

Figure 4:
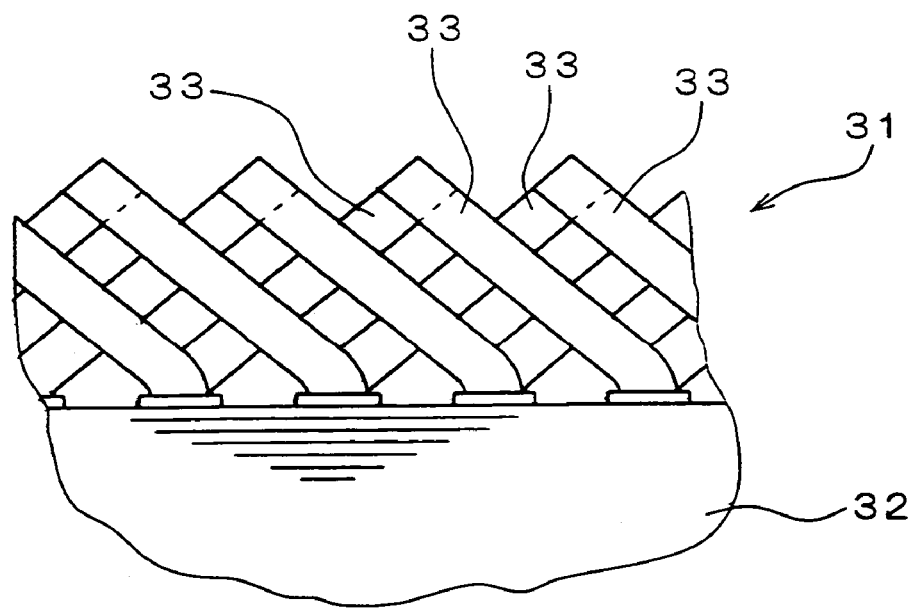
FIG. 4 is a fragmentary side view of the stator.
Figure 5:
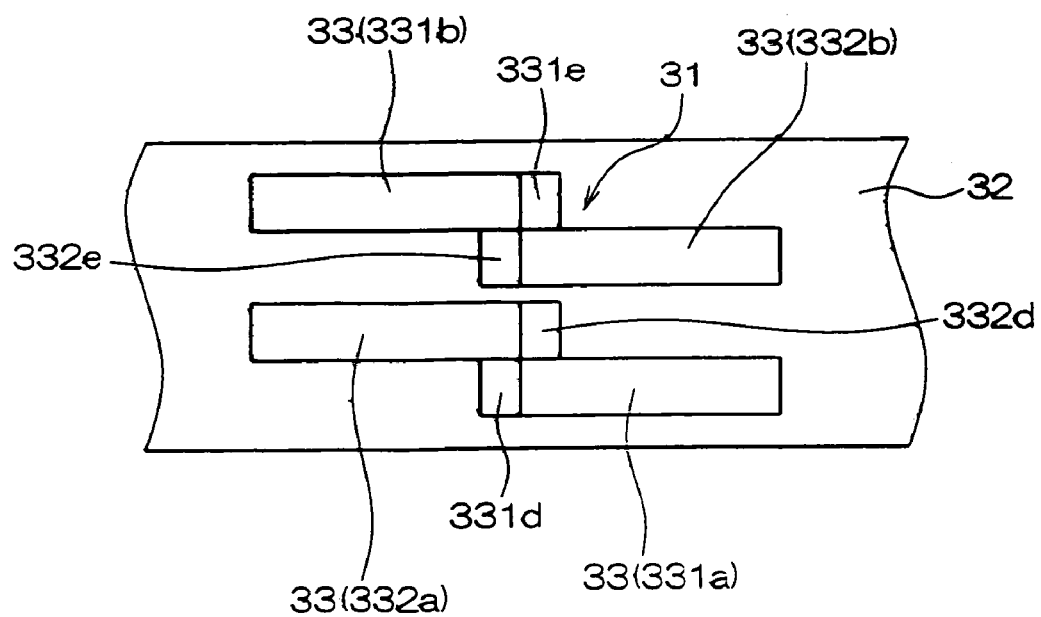
FIG. 5 is a top view of the stator winding.

As shown in FIGS. 4 and 5, the conductors of the conductor segments 33 cross each other at an angle larger than 0 degree. Pairs of the conductors are welded together at side surfaces thereof crossing each other. As shown in FIG. 5, a connection end 331d of the conductor 331a projecting from the innermost layer of a first slot 35 of the stator core 32 contacts a connection end 332d of the conductor 332a projecting from the inner middle layer of second slot 35 on tile respective side surfaces. In tile same manner, a connection end 332e of a conductor 332b projecting from the inner middle layer of the first slot 35 contacts a connection end 331e of a conductor 331b projecting from the inner middle layer of the second slot 35 on the respective side surfaces.

A method of manufacturing the stator winding 31 will be described below.

The basic pair of U-shaped conductor segments 33 is arranged so that the turn portion 331c of the U-shaped larger segment 331 encloses the turn portion 332c of the U-shaped smaller segment 332 and inserted into the slots 35 from a position on one axial end of the stator core 32. The conductor 331a of the larger conductor segment 331 is inserted into the innermost layer of a first one of the slots 35, the conductor 332a of the smaller conductor segment 332 is inserted into the inner middle layer of the first one of the slots 35, the other conductor 331b of the larger conductor segment 331 is inserted into the outermost layer of a second one of the slots 35 that is one pole-pitch clockwise shifted from the first one of the slots 35, and the other conductor 332b of the smaller conductor segment 332 is inserted into the second one of the slots 35.

Accordingly, straight portions of the conductors 331a, 332a, 332b', 331b' are aligned in a slot, as shown in FIG. 3. Here, the conductors 332b' and 331b' are conductors of another basic pair of U-shaped conductor segments that has conductors inserted into another slot that is one pole-pitch shifted.

Thereafter, the straight portion of the conductor 331a projecting from the innermost layer of the slot 35 and the straight portion of the conductor 331b projecting from the outermost layer of the slot 35 are bent by a half pole pitch so that each of the connection ends 331d, 331e of the larger segment 331 expands over one and a half pole pitches, at the second coil-end group 31b. On the other hand, the straight portion of the conductor 332a projecting from the inner middle layer of the slot 35 and the straight portion of the conductor 332b projecting from the outer middle layer of the slot 35 are bent by a half pole pitch so that each of the connection ends 331d, 331e of the larger segment 331 closes. As a result, in the second coil-end group 31b, the conductors that are adjacent to each other respectively incline in the opposite circumferential directions. Thus, all the conductor segments are bent in the same manner as described above.

Figure 12:
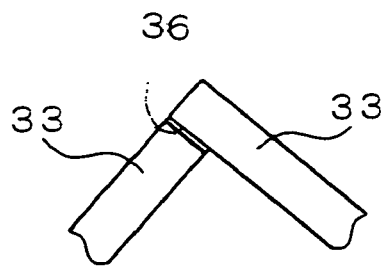
FIG. 12 is a fragmentary side view of connection portions of the conductor segments of a variation of the stator according to the preferred embodiment.
Figure 13:
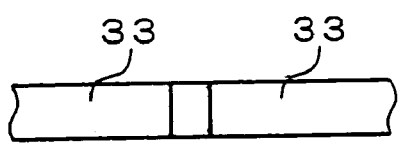
FIG. 13 is a fragmentary top view of connection portions of the conductor segments of the variation.
Figure 14:
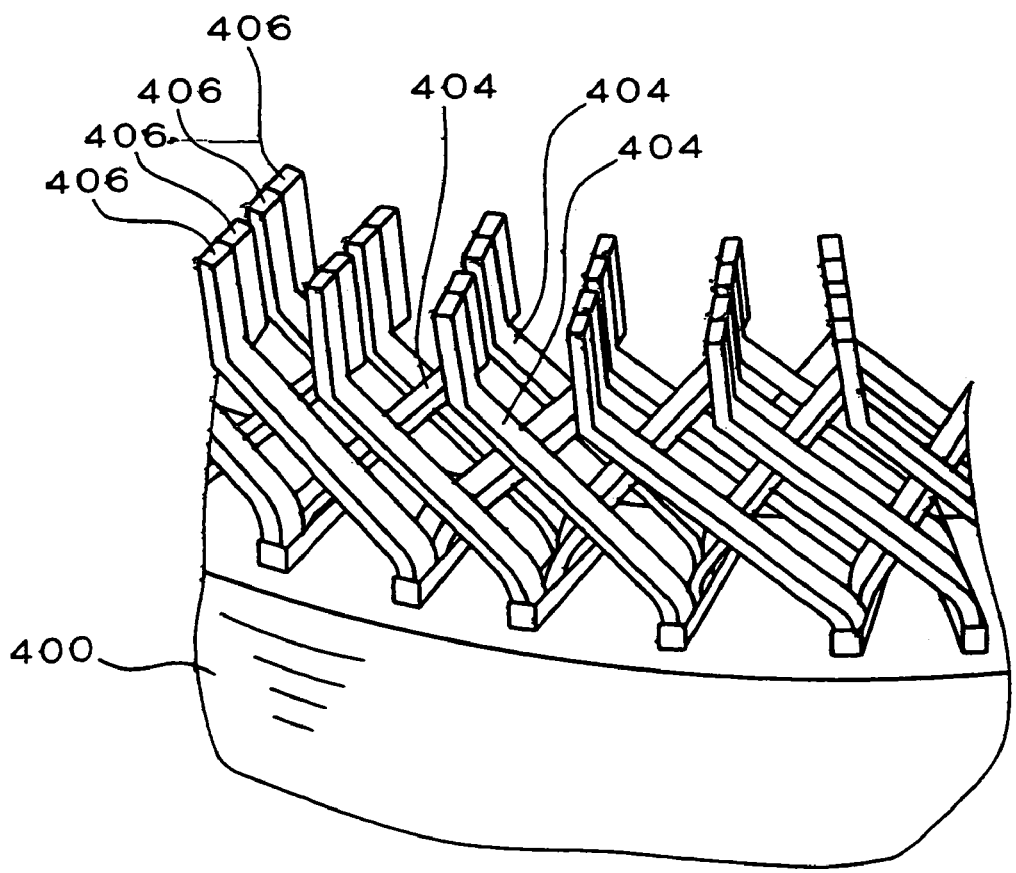
FIG. 14 is a perspective view of a prior art stator.

In the second coil-end group 31b, the connection end 331e' of the conductor 331b projecting from the outermost layer and the connection end 332e of the conductor 332b projecting from the outer middle layer are welded at their side surfaces by a welder such as a ultrasonic welder or an arc welder, or are soldered, as shown in FIG. 4. The conductor segments 33 can be connected in such a manner as shown in FIGS. 12 and 13. That is, the top surface 36 of one conductor segment 33 is welded to a side surface of another conductor segment 33.

Thereafter, the conductors 331a projecting from the innermost layer of the slots 35 and the conductors 332b projecting from the outer middle layer of the slots 35 are bent to incline counterclockwise as viewed from a position above the second coil-end group 31b in the first bending step. Then, the conductors 332a projecting from tile inner middle layer of the slots 35 and the conductors 331b projecting from the outermost layer of the slots 35 are bent to incline clockwise as viewed from a position above the second coil-end group 31b in the second bending step.

Figure 6:
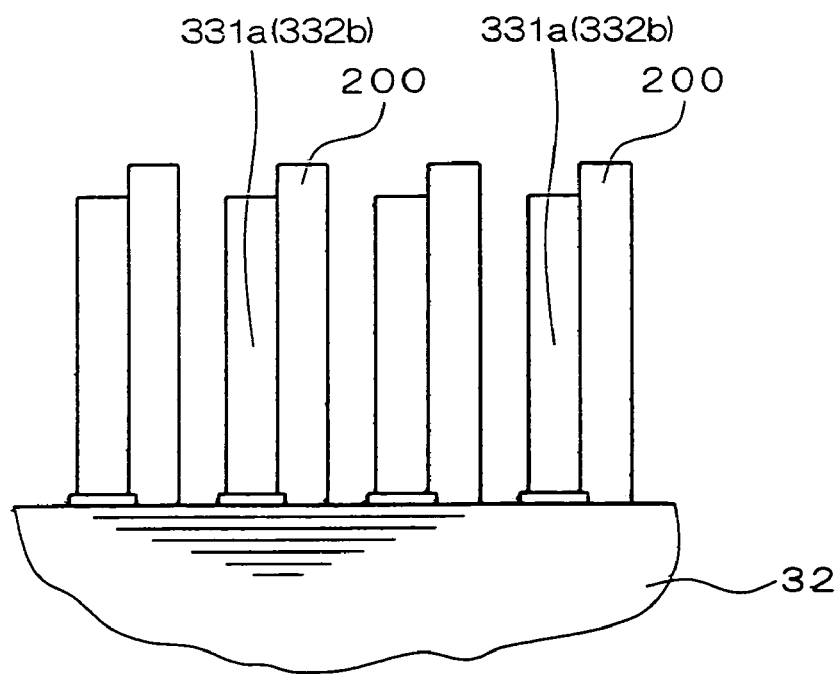
FIG. 6 illustrates a step of bending the conductor segments.
Figure 7:
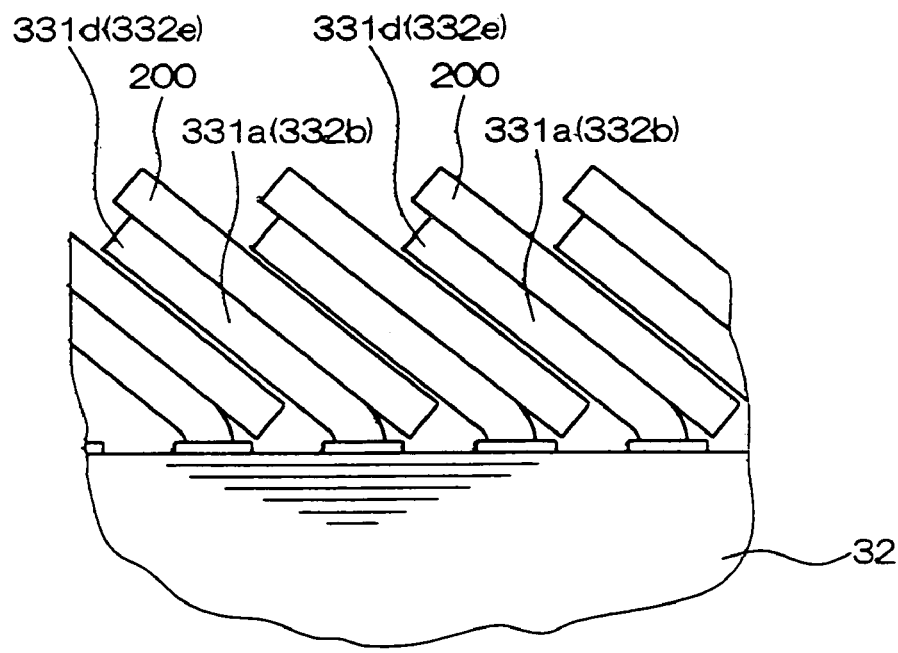
FIG. 7 illustrates a step of bending the conductor segments.

In the first bending step, bending tools 200 are attached to a side surface of the conductors 331a, 332b that becomes upside when the conductors 331a, 332b are bent, as shown in FIG. 6. Each of the tools 200 is turned by a turning device (not shown) counterclockwise about a position near the open end of the slot 35 so that the connection ends 331d, 332e move counterclockwise, as shown in FIG. 7.

Figure 8:
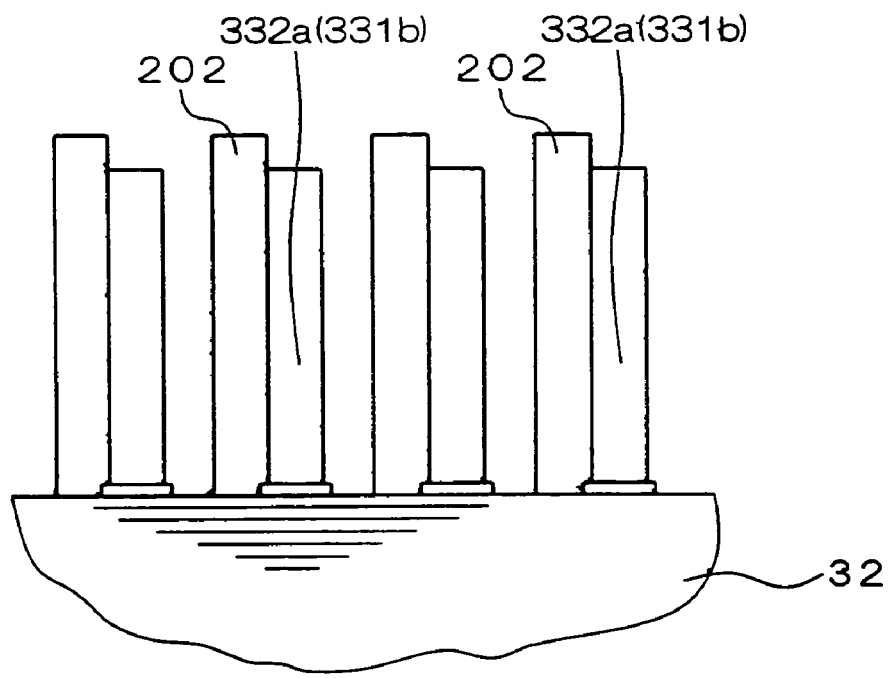
FIG. 8 illustrates a step of bending the conductor segments.
Figure 9:
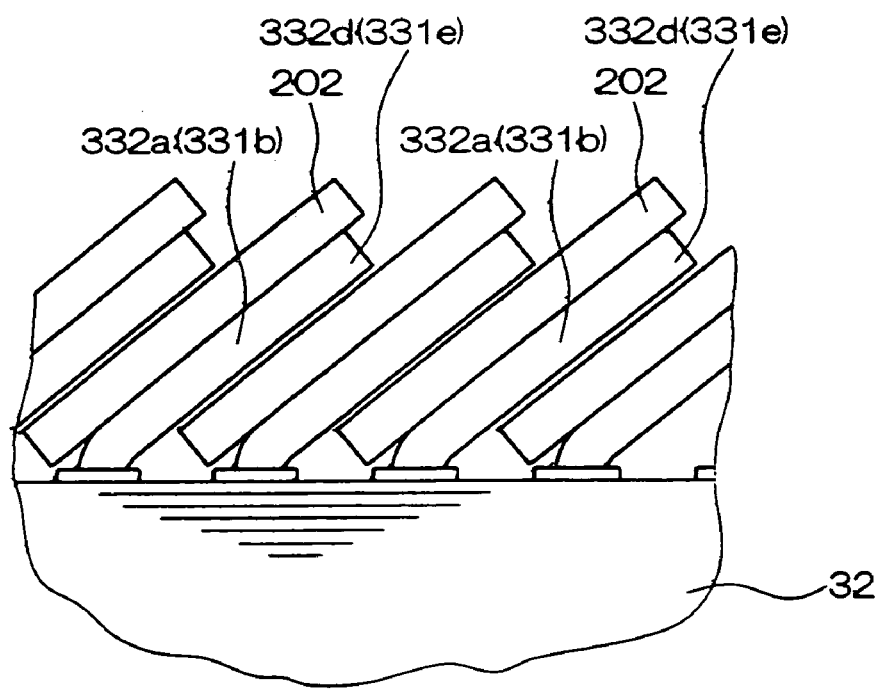
FIG. 9 illustrates a step of bending the conductor segments.

In the second bending step, bending tools 202 are attached to a side surface of the conductors 331a, 332b that becomes upside when the conductors 332a, 331b are bent, as shown in FIG. 8. Each of the tools 202 is turned by a turning device (not shown) clockwise about a position near the open end of the slot 35 so that the connection ends 332d, 331e move clockwise, as shown in FIG. 9.

Therefore, it is not necessary to clamp the connection ends 331d, 331e, 332d, 332e when the conductors 331a, 331b, 332a, 332b are bent.

Figure 10:
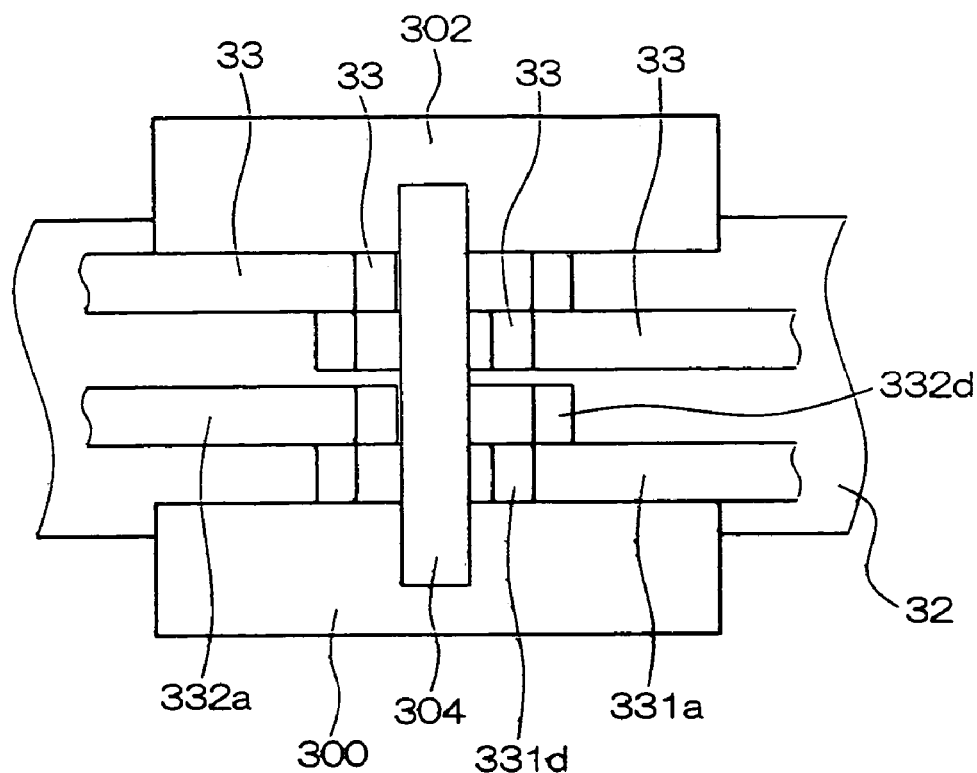
FIG. 10 illustrates a step of bending the conductor segments.
Figure 11:
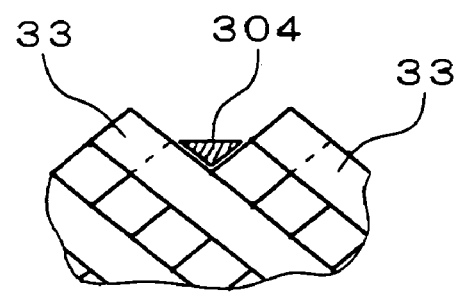
FIG. 11 illustrates a step of bending the conductor segments.

As shown in FIG. 10, the conductor segments 33 are sandwiched by a pair of electrodes, a positive rod electrode 300 disposed radially inside of the stator core and a positive rod electrode 302, in a radial direction of the stator core 32 with a positive rod electrode 304 being on top of the connection portions, as shown in FIG. 11. The conductor segments 33 are welded together when a negative rod electrode is brought near the connection ends to cause an arc discharge. Thus, an axially extending connection end can be omitted.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A method of manufacturing a rotary electric machine stator comprising steps of:

inserting straight portions of conductor segments into each one of a plurality of circumferentially aligned slots of a stator core in a plurality of radially aligned layers;

bending at least a portion of the conductor segments in a first group that project from a first layer of the radially aligned layers of the slots to incline in one circumferential direction;

bending at least a portion of the conductor segments in a second group that project from a second layer adjacent to the first layer of the slots to incline in another circumferential direction so that each extreme end of the conductor segments in the first group crosses one extreme end of the conductor segments in the second group at an angle much greater than 0 degrees; and welding the extreme ends crossing each other to form connection ends, wherein the welding comprises bringing one of a pair of electrodes in face-contact with intermediate portions of the conductor segments between one of the extreme ends and the stator core, and bringing the other electrode of the pair of electrodes near the extreme ends so as to cause an arc discharge at the extreme ends.

2. The method as claimed in claim 1, wherein the steps of bending comprise a step of attaching a bending tool to a side surface of the conductor segments and a step of turning the bending tool about a position near one of the slots.

3. The method as claimed in claim 1, wherein the bending steps comprise inclining the first and second of the conductor segments to cross one another at the intermediate portions.

4. The method as claimed in claim 3, wherein the one of the pair of electrodes is formed to have a triangular cross-section having one side in face-contact with one of the intermediate portions.

5. The method as claimed in claim 1, wherein bending the first and second conductor segments joins the connection ends so that they contact each other at side surfaces thereof.

6. A method of manufacturing a rotary electric machine stator comprising the steps of:

inserting straight portions of a plurality of U-shaped conductor segments into a plurality of slots of a stator core from a first end of the stator core in a plurality of radial layers in each slot so that the straight portions respectively project from the slots on a second end of the stator core;

bending the straight portions so that each of the conductor segments that projects from a first layer group of the radially aligned layers inclines in one circumferential direction, and each of the conductor segments that projects from a second layer group of the radially aligned layers adjacent to the first layer group inclines in an opposite circumferential direction, so that the conductor segments inclined in the one circumferential direction and the conductor segments inclined in the opposite circumferential direction cross each other at extreme ends and at intermediate portions between the extreme ends and the stator core; and welding together the extreme ends that cross each other to form connection ends, wherein the welding comprises bringing one of a pair of electrodes in face-contact with the intermediate portions, and bringing the other of the pair of electrodes near the extreme ends of the conductor segments so as to cause an arc discharge at the extreme ends.

7. The method as claimed in claim 6, wherein the bending steps comprise attaching a bending tool to a side surface of the conductor segments and turning the bending tool about a position near one of the slots.

8. The method as claimed in claim 6, wherein the bending step comprises bending the straight portions so that the extreme ends of the conductor segments inclined in one circumferential direction and the conductor segments inclined in the opposite circumferential direction cross each other at an angle much greater than 0 degrees.

* * * * *